United States Patent
Heuel

(10) Patent No.: US 6,464,286 B2
(45) Date of Patent: Oct. 15, 2002

(54) DOOR OR OTHER BODY PART OF A MOTOR VEHICLE

(75) Inventor: Gerhard Heuel, Wenden (DE)

(73) Assignee: DURA Automotive Plettenberg Entwicklungs-und Vertriebs GmbH, Plettenberg (DE)

( * ) Notice: Subject to any disclaimer, the term of this patent is extended or adjusted under 35 U.S.C. 154(b) by 0 days.

(21) Appl. No.: 09/796,741

(22) Filed: Mar. 2, 2001

(65) Prior Publication Data

US 2001/0029702 A1 Oct. 18, 2001

(30) Foreign Application Priority Data

Mar. 2, 2000 (DE) .......................... 100 10 084
Mar. 21, 2000 (DE) .......................... 100 13 868

(51) Int. Cl.[7] .................................. B60J 1/08
(52) U.S. Cl. .................. 296/146.9; 296/146.5; 296/191
(58) Field of Search .................. 296/146.5, 146.9, 296/191, 190.11, 29

(56) References Cited

U.S. PATENT DOCUMENTS

| 4,818,014 A | * | 4/1898 | Kaye | ............... 296/146.9 X |
|---|---|---|---|---|
| 4,867,501 A | * | 9/1989 | Nomura et al. | ....... 296/146.9 X |
| 4,888,919 A | * | 12/1989 | Strosberg et al. | .... 296/146.9 X |
| 5,322,338 A | * | 6/1994 | Hirakami | ............. 296/146.9 X |
| 5,667,868 A | * | 9/1997 | Freeman | .............. 296/146.9 X |
| 6,109,682 A | * | 8/2000 | Zimmer | ............... 296/146.9 X |
| 6,138,415 A | * | 10/2000 | Ohtsu et al. | ......... 296/146.9 X |
| 6,186,579 B1 | * | 2/2001 | Fussnegger et al. | ..... 296/146.1 |

FOREIGN PATENT DOCUMENTS

| DE | 37 36 938 | 5/1988 |
|---|---|---|
| DE | 37 24 648 | 2/1989 |
| DE | 44 31 991 | 3/1996 |
| DE | 196 16 788 | 11/1997 |

* cited by examiner

*Primary Examiner*—Joseph D. Pape
(74) *Attorney, Agent, or Firm*—Jacobson Holman, PLLC

(57) ABSTRACT

A door or other body part of a motor vehicle comprises an inner skin panel (5) and a preferably painted outer skin (2), which is fastened to the inner skin panel. To improve such a door or another such body part, the outer skin (2) is fastened to the inner skin panel (5) by using punch rivets (11) or other metal fastening elements.

8 Claims, 1 Drawing Sheet

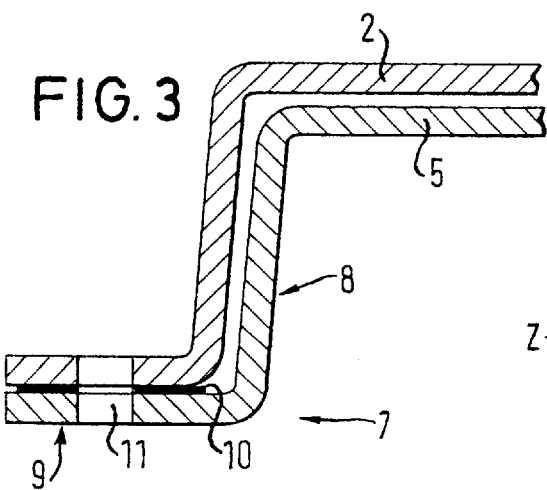
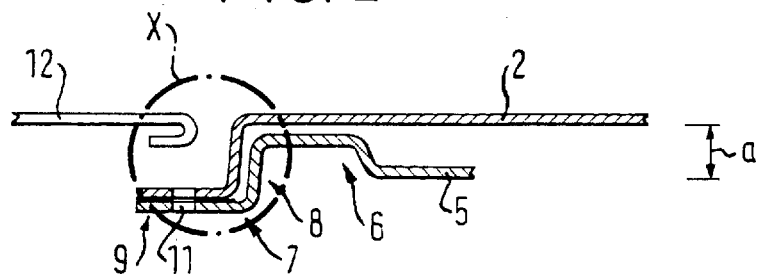
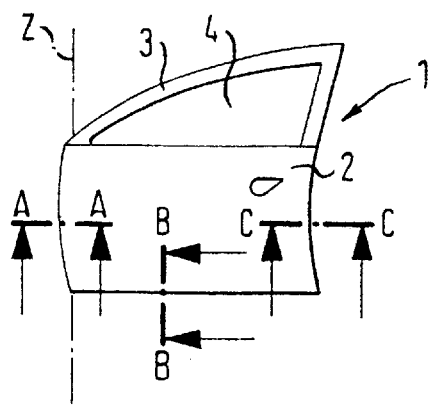
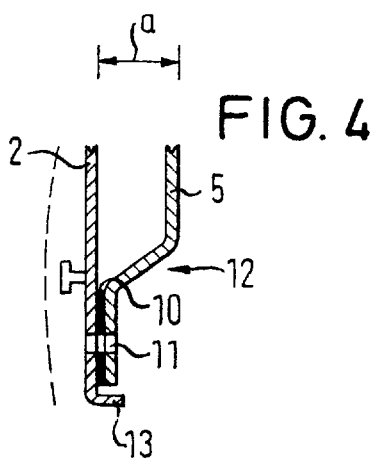
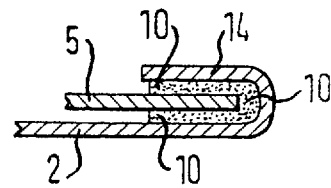

DOOR OR OTHER BODY PART OF A MOTOR VEHICLE

BACKGROUND OF THE INVENTION

Field of the Invention

The invention relates to a door or another body part of a motor vehicle.

The doors and the other body parts of a motor vehicle usually comprise an inner skin panel and an outer skin, attached to said inner skin panel. The outer skin and the inner skin panel must be painted. According to a prior art method, the outer skin is fastened to the inner skin panel by means of a bead and built into the body for subsequent painting. Not until then are the other functional elements affixed in the door or in another body part. During the assembly of these functional elements one must pay attention that the already painted outer skin is not damaged. Thus, the assembly must be carried out very carefully. Nevertheless, it can happen that the painted outer skin is damaged during assembly.

SUMMARY OF THE INVENTION

The object of the present invention is to propose an improved door or an improved other body part of a motor vehicle.

The invention solves this problem with the features of a door or the other body part of a motor vehicle that comprises an inner skin panel and a preferably painted outer skin. The outer skin is fastened to the inner skin panel by means of punch rivets or other fastening elements. Thus, it is possible not to fasten the especially painted outer skin to the inner skin panel until the end of the assembly process, thus to fasten to the inner skin panel, after the other functional elements have already been assembled into the door or into the other body part. The functional elements can be assembled with greater ease and speed. In particular, it is no longer necessary to pay attention to the sensitive painted outer skin when assembling the functional elements. Moreover, this outer skin cannot be damaged during the assembly of the functional elements, since it is assembled last. Another advantage lies in the fact that the outer skin can also be disassembled, if necessary. This feature constitutes a special service related advantage.

To fasten the outer skin to the inner skin panel, all of the fastening elements that facilitate the fastening process at the end of the assembly sequence are suitable. Especially advantageous are fastening elements. Punch rivets have been especially successful in everyday practice.

Advantageous further developments are embodied in the inner skin panel having a bend in an end area. Additionally, the outer skin exhibits a bend in an end area. The outer skin projects over the inner skin panel and is bent. A seal is positioned between the inner skin panel and the outer skin.

It is advantageous for the inner skin panel to exhibit a bend in an end region. The bends can run at right angles. However, it is also possible for the bends to exhibit a larger angle, for example, of 135 degrees. With a bend, which can also be called an offset, the goal is reached that the outer skin and the inner skin panel are spaced apart in the center of the door or the other body part and that they can be connected together in their edge area. Furthermore, the stability in the edge area can be increased. Finally it is also possible to achieve a covering in the hinge area (below the mud guard) or in the area of the axis of rotation of the door.

Another advantageous improvement is characterized in that the outer skin exhibits a bend or offset in an end area.

Another advantageous improvement is characterized in that the outer skin projects over the inner skin panel and is bent. Thus, the area projecting over the inner skin panel can be bent, whereby this area is bent preferably inwardly. Thus, the goal is reached that the outer skin is rounded off in its end region. The bend can be at any arbitrary angle, for example 90 degrees or 180 degrees, whereby, of course, any other angle of curvature is possible.

Preferably a seal is provided between the inner skin panel and the outer skin.

Furthermore, the invention relates to a motor vehicle, which comprises a door, according to the invention, and/or another body part, according to the invention.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Embodiments of the invention are explained in detail below with reference to the attached drawings.

FIG. 1 is a side view of a door of a motor vehicle.

FIG. 2 is a view along the line A—A in FIG. 1.

FIG. 3 is an enlarged view of a detail X of FIG. 2.

FIG. 4 is a view along the line B—B of FIG. 1; and

FIG. 5 is a view along the line C—C of FIG. 1.

DESCRIPTION OF THE INVENTION

Although only one preferred embodiment of the invention is explained in detail, it is to be understood that other embodiments are possible. Accordingly, it is not intended that the invention is to limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

In the central area of the door of the motor vehicle the painted outer skin 2 and the inner skin panel 5 run parallel to each other and at a distance a from each other, as evident from FIG. 2. The distance between the painted outer skin 2 and the inner skin panel 5 is reduced by the bend 6 of the inner skin panel 5 in the end region of the motor vehicle door.

Further outside the bend 6 (thus further to the left in the drawing of FIGS. 2 and 3), there is another bend 7 of the painted outer skin 2 and the inner skin panel 5. The painted outer skin 2 and the inner skin panel 5 exhibit here two opposing bends of 90 degrees or more. The bends are formed in such a manner that the distance, which is now very small, between the painted outer skin 2 and the inner skin panel 5 in the offset legs 8 remains the same at first and then becomes somewhat less in the end legs 9. In the area of the end legs 9 a seal 10 is provided between the painted outer skin 2 and the inner skin panel 5. Furthermore, in this area the painted outer skin 2 is connected by means of a punch rivet 11 to the inner skin panel 5. In this respect the length of the outer edge of the painted outer skin 2 and the inner skin panel 5 exhibits several punch rivets.

The axis of rotation z of the motor vehicle door is located in the area, marked with an X in FIG. 2, where the hinges of the door are fastened. There another outer body part (mud guard) 12 adjoins the painted outer skin 2. Said other outer body part aligns with the painted outer skin 2; and its end, facing the painted outer skin 2, is bent by 180 degrees. The end legs 9 lie, as depicted in FIG. 2, below the end of the body part 12 (mud guard).

The bottom edge of the motor vehicle door 1 is formed, as illustrated in FIG. 4. Here, too, the distance a in the center area of the motor vehicle door is reduced by means of a bend 12 of the inner skin panel, whereby the bend 12 is in essence equivalent to the bend 6. The outer skin 2 projects over the inner skin panel 5. Its end 13, which projects over the inner skin panel 5, is bent inwardly by 90 degrees. The end areas of the painted outer skin 2 and the inner skin panel 5 are connected together by means of punch rivets 11. Furthermore, this area exhibits a seal 10 between the painted outer skin 2 and the inner skin panel 5.

FIG. 5 depicts the design of the rear vertical edge of the motor vehicle door 1. Here, too, the outer skin 2 projects over the inner skin panel 5. The end 14 of the outer skin 2 that projects over the inner skin panel 5 is bent by approximately 180 degrees or less around the end of the inner skin panel 5. Between the inner skin panel 5 and the outer skin 2 there is a seal 10, which envelops the end of the inner skin panel 5 on both sides or on one side.

The invention provides a motor vehicle door or another body part of a motor vehicle that facilitates the assembly of the painted outer skin without bending. The assembly is simplified with punch rivets. All functional elements are easily accessible and can be assembled easily. The outer skin can be assembled last. Furthermore, disassembly of the outer skin is possible (service advantage). Provided is independence from on-line painting. The invention can be realized in an inexpensive manner.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A body part of a motor vehicle, said body part having a central area and comprising an inner skin panel and a painted outer skin spaced a predetermined distance from each other around said central area, said inner skin panel and said painted outer skin each having an end region where said inner skin panel bends towards said painted outer skin to reduce said predetermined distance and said outer painted skin bending thereafter approximately 90 degrees, and metal fastening elements for fastening said painted outer skin to said inner skin panel in said end region.

2. The body part, as claimed in claim 1, wherein said inner skin panel also bends approximately 90 degrees with said bend in the outer painted skin.

3. The body part, as claimed in claim 2, wherein said inner skin panel and said outer painted skin bend another 90 degrees together parallel to said central area to form end legs in said end region.

4. The body part, as claimed in claim 3, wherein a seal is placed between said end leg of said inner skin and said end leg of said outer painted skin in said end region.

5. The body part, as claimed in claim 1, wherein an end leg is formed at said bend of said painted outer skin.

6. The body part, as claimed in claim 5, wherein a seal is placed between said inner skin and said outer painted skin adjacent said end leg.

7. The body part, as claimed in claim 1, wherein an end leg is formed at said bend of said painted outer skin which bends around said inner skin in said end region and points towards said central area.

8. The body part, as claimed in claim 7, wherein a seal is placed between said inner skin and said bent end leg of said outer painted skin.

* * * * *